United States Patent Office 3,145,824
Patented Aug. 25, 1964

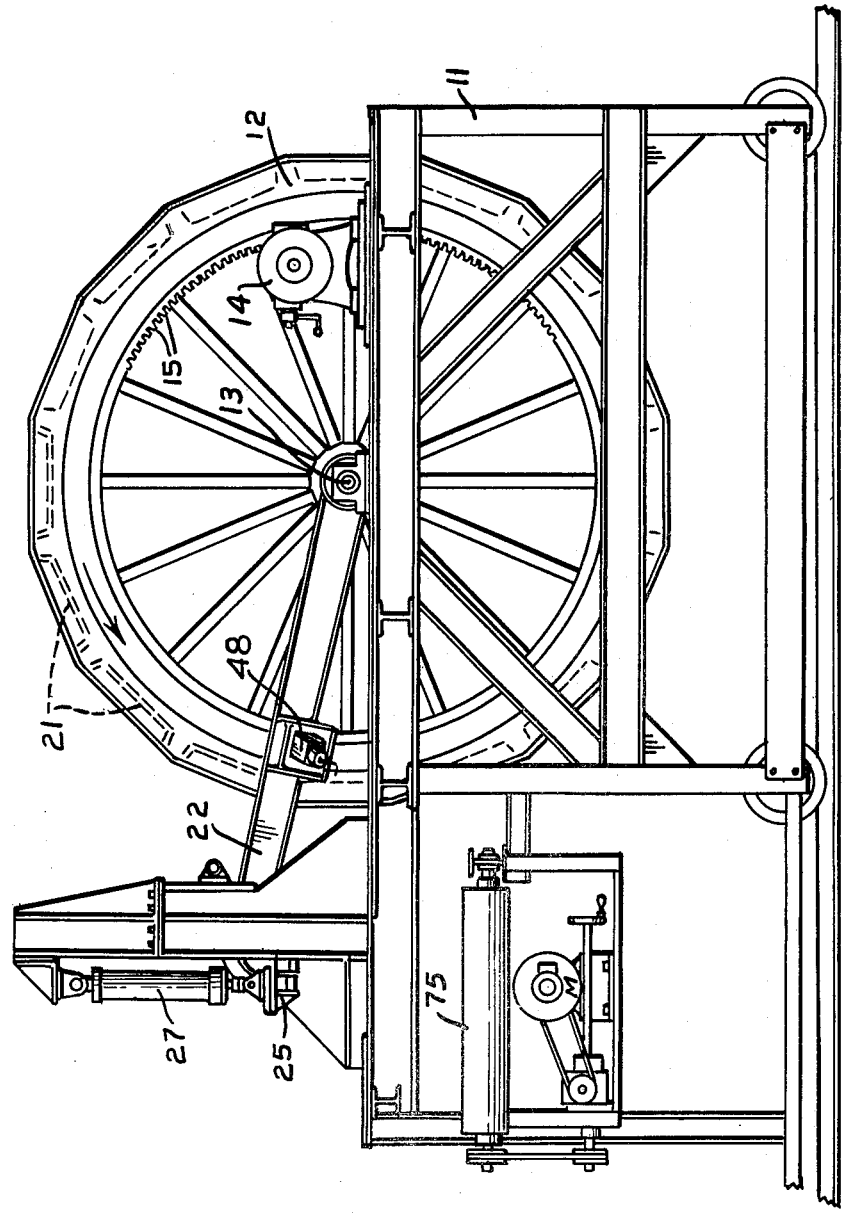

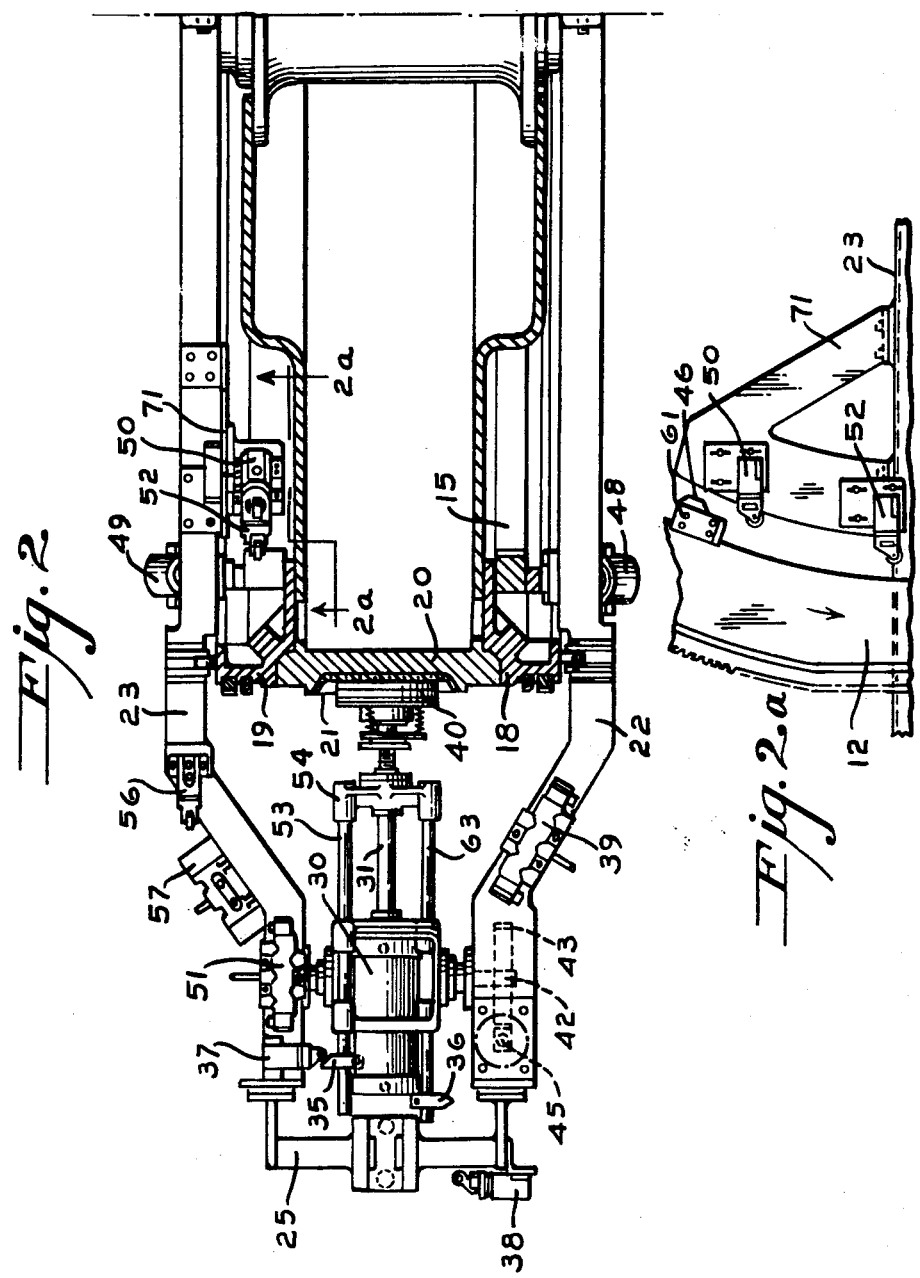

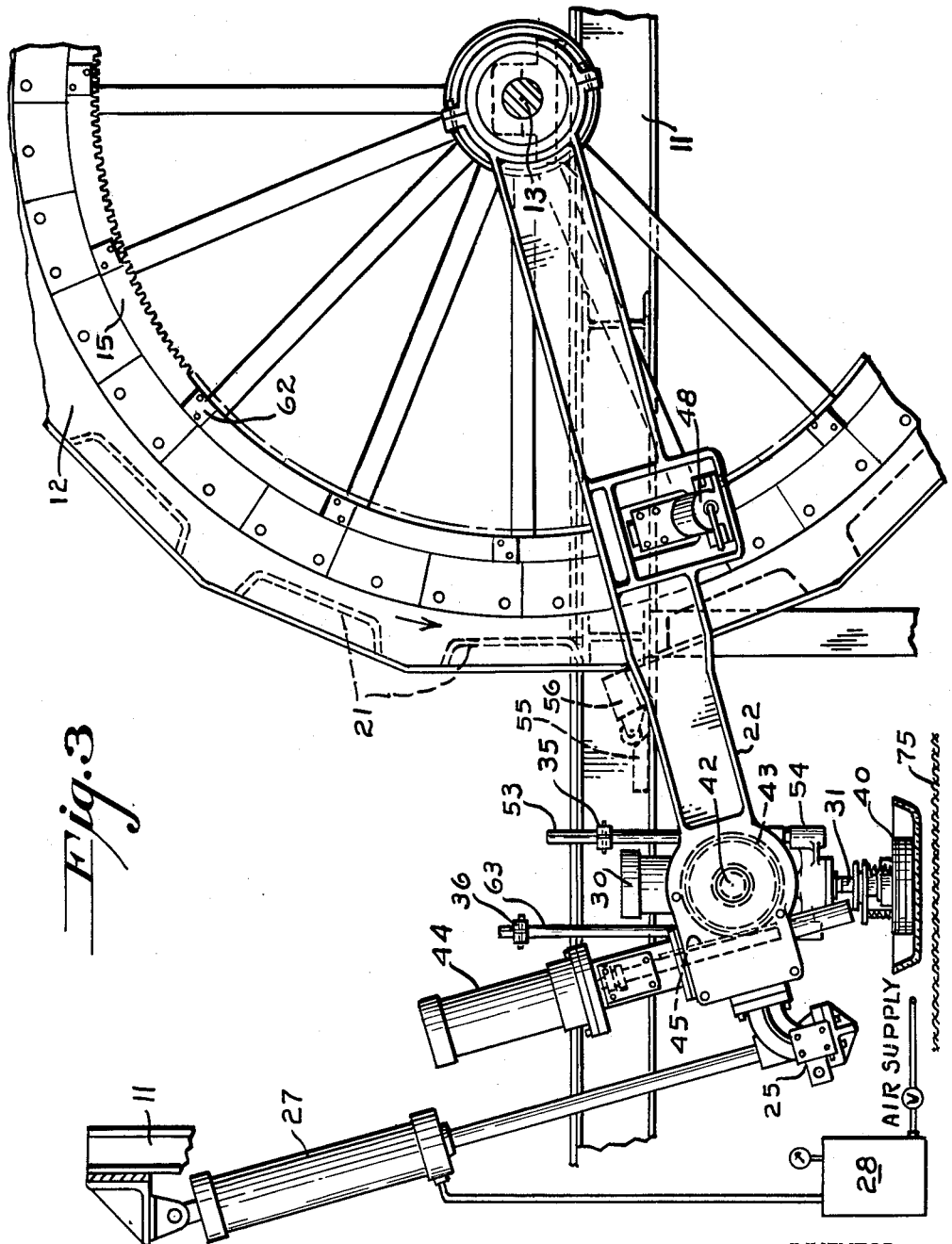

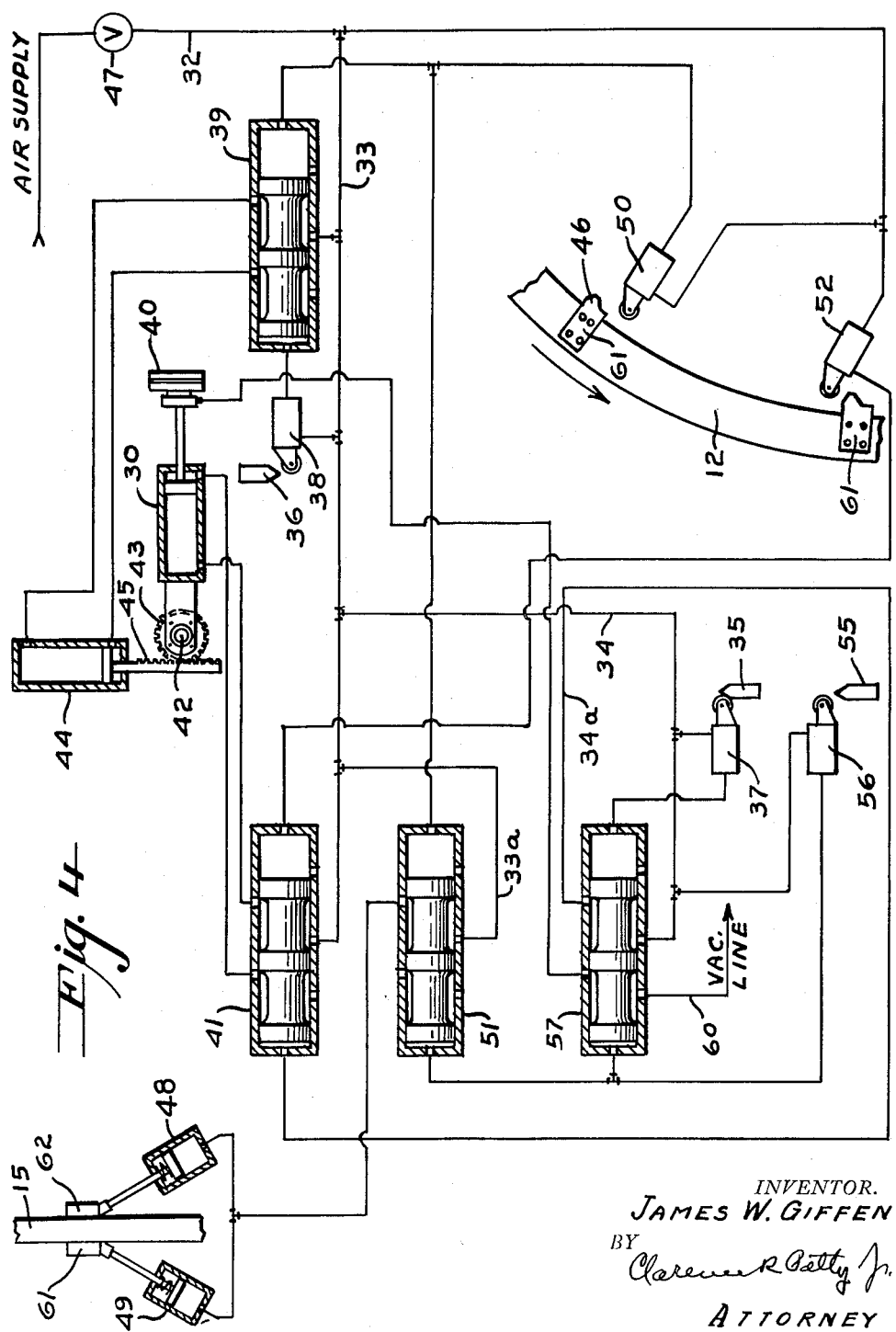

3,145,824
ARTICLE HANDLING
James W. Giffen, Corning, N.Y., assignor to Corning Glass Works, Corning, N.Y., a corporation of New York
Filed Apr. 20, 1962, Ser. No. 189,044
11 Claims. (Cl. 198—27)

The present invention relates to a method of and mechanism for the removal of articles, often referred to as take out devices, from holders uniformly spaced about the perimeter of a conveyor continuously rotating about a horizontal axis, and for depositing such articles at a delivery position, usually onto a belt conveyor.

According to the invention such mechanism embodies a pair of parallel arms arranged on opposite sides of the conveyor and at one end pivoted about the conveyor axis. The other ends of such arms extend generally horizontally a substantial distance beyond the perimeter of the conveyor and are bridged by a cross member from which they are suspended from above by a mechanical linkage embodying a fluid operated unit continuously tending to hold the ends of such arms in the upper of two alternative arcuate positions about the conveyor. Apparatus bridging a region of such arms between the perimeter of the conveyor and the cross member and pivoted about an axis parallel to that of the conveyor embodies a downwardly facing vacuum chuck depending from the piston rod of a fluid operated unit adapted to project the chuck into association with a conveyor holder from which an article contained therein is to be removed. A pinion is carried by an axial support shaft of such unit in mesh with a rack projecting from the piston rod of another fluid operated unit, supported on one of such arms, to provide for the turning movement of the chuck to a position facing a holder from which an article is to be removed. Clutch units, associated with the arms, are arranged to lock them for turning movement with the conveyor while the arms occupy planes parallel to the entrance path to a holder, thus making it available to the article chuck. While the arms and mechanism are moving with the conveyor about its axis the chuck actuating fluid units referred to are actuated to first appropriately turn the chuck to bring it into facing relation with such article holder and to then move into association therewith. In the meantime a source of vacuum is connected to the chuck in substitution for a normally provided positive air pressure line connection thereto to effect seizure of an article in such holder. The fluid operated chuck actuating units are then operated to restore the chuck to its initial position with an article suspended therefrom. By such time the conveyor has lowered the arms to a position in which the downwardly facing chuck is just above a conveyor belt provided to receive the article and reconnection of the positive pressure air line to the chuck is made to release the article onto the conveyor belt. An instant later the clutch units are disabled to permit the fluid operated unit of the linkage from which the arm ends are suspended to quickly restore them to their initial position.

For a better understanding of the invention the same will be described as applied to a conveyor such as embodied in the glass forming machine disclosed in applicant's co-pending application Serial No. 189,145 filed on even date herewith.

In the accompanying drawings—

FIG. 1 is a side elevational view of a rotary conveyor with which is associated mechanism embodying the invention in its normal position.

FIG. 2 is a sectional plan view of a fragment of such rotary conveyor, on an enlarged scale, showing the vacuum chuck of the mechanism in engagement with an article about to be withdrawn from an article holder of the conveyor.

FIG. 2a is a view taken in line 2a—2a of FIG. 2.

FIG. 3 is a view similar to FIG. 1 of a fragment of such apparatus, on an enlarged scale and with such mechanism in the position in which it is about to release an article therefrom onto a conveyor belt.

FIG. 4 is a piping diagram.

For a more comprehensive description of the invention reference is now made to the drawings in detail, wherein the reference numeral 11 designates a wheeled carriage supporting a conveyor 12 continuously rotatable about an axle 13 in a counterclockwise direction by a motor 14 having a drive pinion (not shown) in mesh with a conveyor ring gear 15. As shown the (FIG. 2) rims 18 and 19 of the conveyor 12 are bridged by radially outwardly facing article holders, such as 20, uniformly spaced from one another, as is clear from FIGS. 1 and 3. As illustrated some of the holders are occupied with articles, such as 21 whose manner of becoming arranged therein is not shown, having no bearing on the present invention.

The mechanism embodying the invention for effecting removal of articles from the conveyor 12 embodies two arms 22 and 23 at one end pivoted about the axle 13 on opposite sides of the conveyor. Arms 22 and 23 extend alongside the conveyor 12 well beyond the perimeter thereof where their ends are connected to one another by a bridging member 25 from which they are suspended in the upper of two alternative arcuate positions about the conveyor 12 by means of a linkage including a pneumatic cylinder unit 27 continuously supplied with air at a regulated pressure from a tank 28.

In the region between the arm bridging member 25 and the perimeter of conveyor 12 is a housing embodying a fluid cylinder unit 30 pivotally bridged across arms 22 and 23. Normally the rotary position of unit 30 is such that its piston rod 31 depends therefrom, in the rotary position substantially as illustrated in FIG. 3. At its lower end rod 31 carries an article chuck 40.

The housing in which cylinder unit 30 is embodied has an axle 42 (FIGS. 2, 3, and 4) carrying a pinion 43 arranged within a cavity in arm 22 (FIGS. 2 and 3). Arranged on arm 22 leftwardly above pinion 43 is a fluid cylinder unit 44 having a rack 45 projected from the lower end of its depending piston rod in mesh with pinion 43, whereby by supplying fluid to the cylinder unit 44 the chuck 40 can be turned from a facing down position as shown in FIG. 3 to a position facing an article holder such as 20 (FIG. 2), wherein the chuck 40 as shown has been moved into association with such holder 20 by its fluid cylinder unit 30.

As previously mentioned the removal of an article 21 from a holder such as 20 is effected while moving arms 22 and 23 from their normal to their alternative positions. To effect such movement arms 22 and 23 are provided with fluid operated and spring restored units 48 and 49 respectively having elements projectable thereby into the path of plates such as 61 and 62 (FIGS. 2, 3, and 4) arranged on opposite sides of the conveyor 12. Units 48 and 49 are operable by fluid supplied by a feed valve 51 (FIG. 4) when its spool is in its leftward position. Fluid is fed to the valve 51 for this purpose by a pilot valve 50 opened when a cam 46 on the conveyor engages it. The coupling of arms 22 and 23 to the conveyor is aranged to occur when a holder reaches a position available to chuck 40.

The fluid operated cylinder unit 44, provided to effect turning movement of the chuck 40 between a downwardly facing or article delivery position and a position facing a work holder 20 available thereto, has operating fluid supplied thereto by a feed valve 39 under control of pilot valves 38 and 50 respectively.

The fluid operated cylinder unit 30, provided to move the chuck into cooperative relation with a holder 20 made available thereto, has operating fluid supplied thereto by a feed valve 41 under control of pilot valve 52 and provided with fluid for restoring it through feed valves 57 and 41 under control of a pilot valve 37.

The chuck 40 is connected to a vacuum line 60 to effect seizure of an article 21 in holder 20 and with a line supplying positive pressure thereto to eject the article therefrom by a feed valve 57 under control of pilot valves 56 and 37 respectively.

Pilot valves 50, 52, 37, 38, and 56 are operable in succession to effect a complete operating cycle of the mechanism. Pilot valve 50 is supported on a bracket 71 (FIGS. 2 and 2a) attached to arm 23 and is operated by a cam 46 on conveyor 12 as the conveyor 12 is approaching a position in which a holder 20 will be available to the chuck 40.

Pilot valve 50 is operated by cam 46 to couple the arms 22 and 23, through the medium of plates 61 and 62 carried by the conveyor 12 in the exact desired rotary position relative thereto at which a holder 20 is available to the chuck 40. Operation of pilot valve 50 also causes the operation of unit 44 to rotate unit 30 into a position in which a holder 20 will be available to chuck 40. Pilot valve 52 is subsequently operated by cam 46 to cause the operation of unit 30 to move the chuck 40 into association with the available holder 20.

With the chuck 40 associated with a holder 20 as shown, pilot valve 37 is opened by a cam 35 carried on a cam shaft 53 supported on a cross head 54 carried by the piston rod 31 of unit 30 to effect substitution of a vacuum line connection to the chuck 40 for the connection of a positive pressure line thereto. This operation is effected by a feed control valve 57 which in the position alternative to that shown feeds fluid to unit 30 through feed valve 41 to withdraw the chuck 40 from association with a holder 20.

With chuck 40 in its withdrawn position a cam 36 carried by a cam shaft 63 attached to cross head 54 opens pilot valve 38 to bring about the rotary restoration of the chuck 40 with an article suspended therefrom and which will be released therefrom at such time that pilot valve 56 is actuated to halt the travel of arms 22 and 23.

As illustrated in FIG. 4 the fluid feed valves 41, 39, 51, and 57 are in their alternative positions. As will be seen under these circumstances operating air is being supplied to the upper end of unit 44 from supply line 32, branch 33, through valve 39 to the upper end of unit 44, and through valve 41 to the left end of unit 30 to maintain them in the positions in which they are shown in FIGS. 2 and 4. Air is also being supplied to units 48 and 49 from branch fluid supply line 33a through valve 51, and the vacuum line 60 is connected by valve 57 to chuck 40. The valve 57 has also at the time supplied air to the left end of valve 41 to move its spool to the right to effect the withdrawal of chuck 40 with article 21 from association with holder 20. As such withdrawal is being completed cam 36 operates pilot valve 38 which feeds fluid to the leftward end of feed valve 39 to move its spool to the right and thus reverse the connections to unit 44 to restore the chuck 40 to its downwardly facing position with article 21 suspended therefrom.

Finally the cam 55 is engaged by the pilot valve 56 which operates and feeds fluid to the leftward ends of feed valves 51 and 57 respectively. The valve 51 in moving its spool to the right substitutes the connection of fluid line 34 to chuck 40 for the vacuum line 60 to release the article 21 from the chuck.

Valve 51 in moving its spool to its rightward position connects units 48 and 49 to atmosphere permitting the arms 22 and 23 to be restored to their upward position by unit 27. A subsequent unloading cycle is subsequently initiated by the engagement of a cam 46 with pilot valve 50. When this occurs fluid is fed to the rightward ends of valves 39 and 51 to restore their spools to the positions shown. Feed valve 51 accordingly again feeds fluid to units 48 and 49 to again couple the arms to conveyor 12 and valve 39 again feeds fluid to unit 40 to rotate the chuck to a horizontal position. These operations are followed by the engagement of a cam 46 with pilot valve 52 which again supplies fluid to valve 41 to restore its spool to the position shown whereby it reverses the connections to unit 30 to advance chuck 40 to the position shown.

What is claimed is:

1. The combination with a conveyor continuously rotatable about a horizontal axis and having article holders uniformly spaced about its periphery facing radially outwardly, of a take out mechanism embodying a chuck for unloading articles from said supports during their travel through a predetermined arc, means supporting said chuck in an initial position adjacent the path of travel of the conveyor periphery, means for moving such chuck in unison with the conveyor through such predetermined arc concentric with said horizontal axis of rotation, means operable during such unified movement through said concentric arc for turning said chuck from a downwardly facing position to a position facing one of said holders, for projecting the chuck into association with such holder into engagement with an article occupying it, for energizing the chuck to effect seizure of the article, for withdrawing the chuck from association with such holder, for turning said chuck to restore it to its downwardly facing position and for then de-energizing the chuck to release an article therefrom, and means for then restoring said chuck supporting means to its initial position.

2. A combination as in claim 1 wherein the means for supporting said chuck comprises two parallel arms arranged on opposite sides of the conveyor and at one end pivoted about an axis coextensive with the conveyor axis of rotation and a linkage at their other ends to establish the initial position of said chuck.

3. A combination as in claim 2 wherein the means for moving the chuck in unison with the conveyor comprises a device for mechanically coupling said arms thereto, and the means for restoring the chuck to its initial position comprises a fluid operated unit in such linkage.

4. A combination as in claim 1 wherein the means for turning said chuck between a downwardly facing position and a position facing an article holder comprises a fluid operated unit and a rack and pinion, and the means for moving the chuck into and out of associatin with an article holder comprises a further fluid operated unit.

5. A combination as in claim 1 wherein the means supporting said chuck in the initial position comprises a linkage embodying a fluid operated unit, and the means for moving such chuck in unison with the conveyor includes a fluid operated coupling therebetween.

6. A combination as in claim 5 wherein there is means carried by the conveyor for periodically activating one of said fluid cylinders.

7. The combination with a generally circular conveyor continuously rotating about a horizontal axis and having article holders arranged in uniformly spaced relation about the perimeter thereof, of article take-out mechanism pivoted about the conveyor axis, means for swinging said mechanism back and forth through an arc concentric with the axis of rotation of such conveyor, apparatus embodied in said mechanism for seizing an article in one of such holders withdrawing it therefrom and depositing it at a delivery position while said mechanism is rotating through such arc in unison with said conveyor, and means for operating said apparatus during the time it is traveling in the direction of rotation of said conveyor.

8. A combination as in claim 7 wherein means is provided affording a temporary mechanical linkage between the mechanism and the conveyor to effect travel of the mechanism in unison with the conveyor.

9. The combination with a conveyor continuously rotatable in a vertical plane, having article holders arranged in uniformly spaced relation about the perimeter thereof; of a pair of parallel arms arranged on opposite sides of the conveyor at one end pivoted at the axis thereof and at the other end terminating outside the perimeter of the conveyor, a mechanism carried by said arms near their other ends, means for normally suspending the other ends of said arms at the upper of two alternative arcuate positions about said conveyor, means for effecting their movement by said conveyor to the lower position when an article is to be removed from one of said holders, an article chuck embodied in said mechanism normally suspended therefrom, means embodied in such mechanism for turning said chuck to a position facing the holder from which an article is to be removed and advancing it into engagement with such an article, means to activate the chuck to effect article seizure, said turning and advancing means being then operable to restore the chuck to its initial position with respect to said mechanism, means for thereafter disabling the chuck to release a seized article threfrom, and means for disabling the means effecting lowering of the arm to enable the arm end suspending means to restore the arms and said mechanism to their initial positions.

10. The combination with a conveyor continuously rotating about a horizontal axis and having article holders arranged about its periphery facing radially outward therefrom, of a support having a chuck thereon arranged for movement in an arc concentric with the path of travel of such holders, means for periodically coupling said support to said conveyor to effect its movement in unison therewith through a predetermined arc of its travel concentric with the horizontal axis of rotation, means carried by said support for activating such chuck during such movement to seize an article from one of said holders, withdraw it therefrom and deposit it at a delivery position, and means for thereafter restoring said support to its initial position.

11. A combination as in claim 10 wherein the support comprises two arms pivoted at one end in common axial relation with the axis of rotation of the conveyor and near their other ends support said chuck.

References Cited in the file of this patent

UNITED STATES PATENTS

| | | |
|---|---|---|
| 1,845,830 | Chaplin | Feb. 16, 1932 |
| 2,011,793 | Bond | Aug. 20, 1935 |
| 2,249,201 | Ferguson | July 15, 1941 |